US012768784B2

(12) United States Patent
Kishore

(10) Patent No.: US 12,768,784 B2
(45) Date of Patent: Oct. 20, 2026

(54) METHODS AND APPARATUSES FOR MEASURING FLUID COMPOSITION AND TURBIDITY

(71) Applicant: HONEYWELL INTERNATIONAL INC., Charlotte, NC (US)

(72) Inventor: Kuna Venkat Satya Rama Kishore, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 204 days.

(21) Appl. No.: 18/666,020

(22) Filed: May 16, 2024

(65) Prior Publication Data

US 2024/0402083 A1 Dec. 5, 2024

(30) Foreign Application Priority Data

May 31, 2023 (IN) ............................ 202311037487

(51) Int. Cl.
*G01N 21/53* (2006.01)
*G01N 21/05* (2006.01)
(Continued)

(52) U.S. Cl.
CPC ............ *G01N 21/53* (2013.01); *G01N 21/05* (2013.01); *G01N 21/8806* (2013.01);
(Continued)

(58) Field of Classification Search
CPC .... G01N 21/53; G01N 21/05; G01N 21/8806; G01N 2021/052; G01N 2021/1748; G01N 2021/1765; G01N 2021/8841; G01N 2201/06113; G01N 15/075; G01N 15/0205; G01N 2015/0053
See application file for complete search history.

(56) References Cited

U.S. PATENT DOCUMENTS 10,925,549 B2 2/2021 Yu et al.
2008/0047833 A1 2/2008 Hirahara et al.
(Continued)

FOREIGN PATENT DOCUMENTS

JP 2008-003074 A 1/2008

OTHER PUBLICATIONS

Alejandro J. Gimenez et al., "Turbidimetry by Image Degradation Analysis," IEEE Transactions on Instrumentation and Measurement, 69(10):7574-7579, (Oct. 2020).
(Continued)

*Primary Examiner* — Thanh Luu
*Assistant Examiner* — Mai Thi Ngoc Tran
(74) *Attorney, Agent, or Firm* — Alston & Bird LLP

(57) ABSTRACT

Systems and methods for measuring a fluid turbidity and a fluid composition by a controller component are provided. The method includes, but not limited to: causing a light source to project at least one light beam through an image pattern slide and a fluid flow through a tube, where the image pattern slide is located between the light source and a first sidewall of the tube; causing the imager to capture a baseline image of the image pattern slide; causing an imager to capture an image of the image pattern slide; and determining the fluid turbidity based on the image of the image pattern slide and a baseline image of the image pattern slide.

18 Claims, 12 Drawing Sheets

(51) Int. Cl.
*G01N 21/17* (2006.01)
*G01N 21/88* (2006.01)

(52) U.S. Cl.
CPC .................. *G01N 2021/052* (2013.01); *G01N 2021/1748* (2013.01); *G01N 2021/1765* (2013.01); *G01N 2021/8841* (2013.01); *G01N 2201/06113* (2013.01)

(56) References Cited

U.S. PATENT DOCUMENTS

| | | | | |
|---|---|---|---|---|
| 2009/0230324 | A1 | 9/2009 | Gratton et al. | |
| 2010/0188660 | A1* | 7/2010 | Palumbo | G01N 21/59<br>356/432 |
| 2011/0066382 | A1* | 3/2011 | Adams | G01N 33/1893<br>702/19 |
| 2013/0293706 | A1* | 11/2013 | Pison | G01N 21/51<br>348/135 |
| 2020/0124514 | A1 | 4/2020 | Kondo et al. | |

OTHER PUBLICATIONS

Extended European Search Report Mailed on Oct. 9, 2024 for EP Application No. 24172813, 14 page(s).
Shichao Xu et al., "Comparative study of two ballistic imaging methods based on the femtosecond optical Kerr gate and spatial filtering," Optical Engineering, 53(9):093102-1-093102-5, (Sep. 2014).
V. I. Golovanov et al., "Main Factors Affecting the Photographic Determination of the Turbidity and Chromaticity of Water," Journal of Analytical Chemistry, 75(3):320-329, (2020).
V. I. Golovanov et al., "Use of Contrast of Digital Photo Images for the Determination of the Turbidity of Liquids," Journal of Analytical Chemistry, 73(7):667-673, (2018).
Intention to grant Mailed on Jul. 30, 2026 for EP Application No. 24172813, 6 page(s).

* cited by examiner

METHODS AND APPARATUSES FOR MEASURING FLUID COMPOSITION AND TURBIDITY

CROSS-REFERENCE TO RELATED APPLICATIONS

This application claims priority pursuant to 35 U.S.C. 119 (a) to Indian Application No. 202311037487, filed May 31, 2023, which application is incorporated herein by reference in its entirety.

FIELD OF THE INVENTION

Exemplary embodiments of the present disclosure relate generally to apparatuses for measuring fluid composition and turbidity, and more particularly, in some examples, to methods, apparatuses, and systems for measuring fluid composition and fluid turbidity.

BACKGROUND

Applicant has identified many technical challenges and difficulties associated with fluid composition and turbidity measurement. Through applied effort, ingenuity, and innovation, Applicant has solved problems relating to improving measuring accuracy of the fluid composition and the fluid turbidity by developing solutions embodied in the present disclosure, which are described in detail below.

BRIEF SUMMARY

Various embodiments described herein relate to components, apparatuses, and systems for measuring a fluid turbidity and a fluid composition.

In accordance with various embodiments of the present disclosure, a method for measuring a fluid turbidity and a fluid composition by a controller component is provided. The method includes, but not limited to: causing a light source to project at least one light beam through an image pattern slide and a fluid flow through a tube, where the image pattern slide is located between the light source and a first sidewall of the tube; causing the imager to capture a baseline image of the image pattern slide; causing an imager to capture an image of the image pattern slide; and determining the fluid turbidity based on the image of the image pattern slide and the baseline image of the image pattern slide.

In some embodiments, determining the fluid turbidity based on the image of the image pattern slide and the baseline image of the image pattern slide includes, but not limited to: generating a blur matrix by comparing the image of the image pattern slide with the baseline image of the image pattern slide; and determining the fluid turbidity based on the blur matrix.

In some embodiments, the method further includes determining the fluid composition based on the image of the image pattern slide and the baseline image of the image pattern slide.

In some embodiments, determining the fluid composition based on the image of the image pattern slide and the baseline image of the image pattern slide the fluid turbidity includes, but not limited to: calculating a particle scattering angle by comparing the image of the image pattern slide with the baseline image of the image pattern slide; and determining the fluid composition based on the particle scattering angle.

In some embodiments, the at least one light beam is a coherent light beam.

In some embodiments, the imager is located on a second sidewall of the tube, and the imager is a CMOS or CCD camera, configured to capture the image of the image pattern slide by generating digital image data of the image pattern slide.

In some embodiments, the tube is made of a material that allows the at least one light beam to pass through, and configured to define a flow channel for the fluid flow with suspended particles to flow through.

In some embodiments, the image pattern slide has a checkered pattern.

In some embodiments, the image pattern slide has a concentric stars pattern.

In some embodiments, the image pattern slide has a black triangles pattern, wherein a distance between two adjacent black triangles increase/decrease linearly along edges of the two adjacent black triangles.

According to another embodiment, an apparatus for measuring a fluid turbidity and a fluid composition by a controller component is provided. The apparatus includes, but not limited to: a light source; a tube; an image pattern slide; an imager located on a second sidewall of the tube; and a controller component electrically connected to the light source and the imager, wherein the controller component is configured to: cause the light source to project at least one light beam through an image pattern slide and a fluid flow through the tube; cause the imager to capture a baseline image of the image pattern slide; cause the imager to capture an image of the image pattern slide; and determine the fluid turbidity based on the image of the image pattern slide and a baseline image of the image pattern slide.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
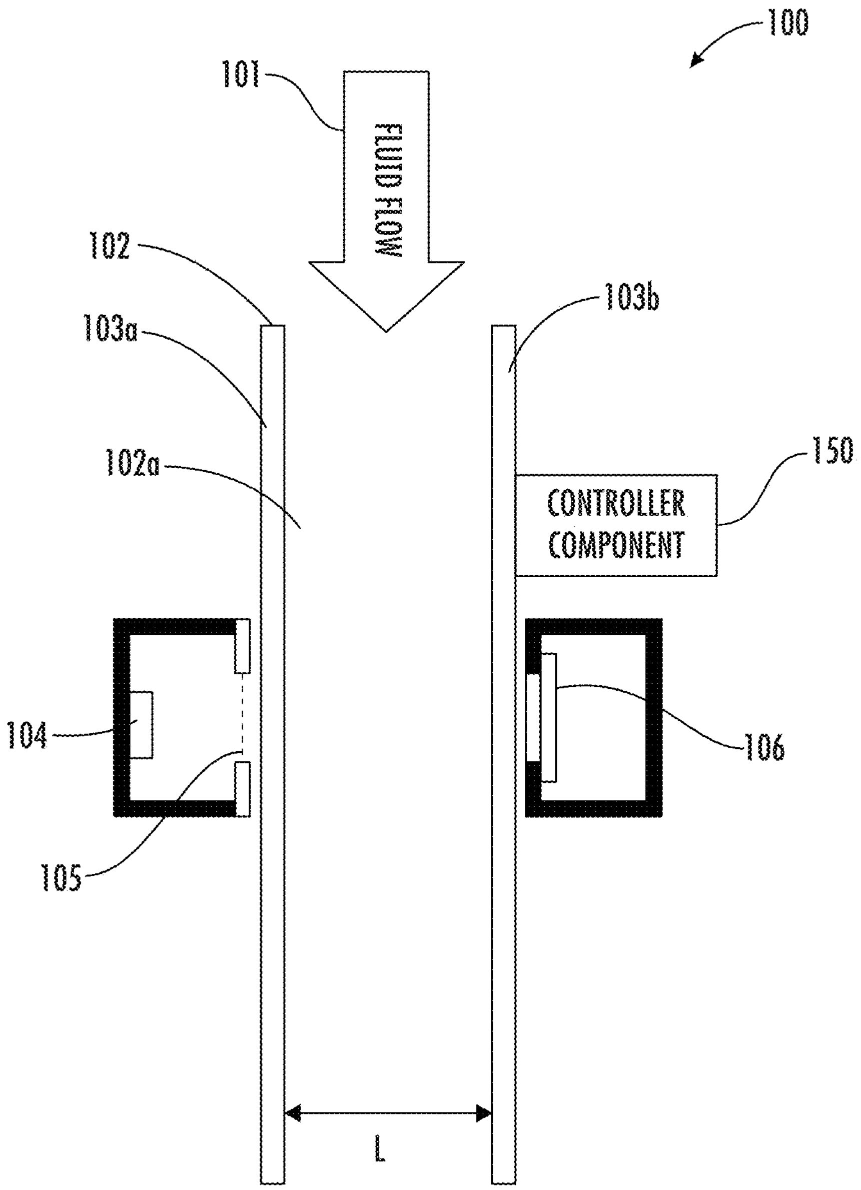
FIG. 1 illustrates an exemplary diagram depicting an apparatus for measuring a fluid turbidity and a fluid composition, in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as "comprises", "includes", and "having" should be understood to provide support for narrower terms such as "consisting of", "consisting essentially of", and "comprised substantially of".

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Various example embodiments address exemplary technical problems associated with determining fluid composition and turbidity (e.g. a type of suspended particles in a fluid flow and a cloudiness of the fluid flow). As understood by those of skill in the field to which the present disclosure pertains, for example, a fluid composition and turbidity may be measured by using light scattering/absorption techniques. For example, a fruit pulp suspension concentration may be measured using the light scattering/absorption techniques, such that the fluid composition (e.g., sugars, stabilizers, etc.) may be measured. In a further example, cell type and cell amount may be measured using the light scattering/absorption techniques, such that the fluid composition (e.g., blood cell, red blood cells, neutrophiles, leukocytes, cosinophiles, etc.) may be measured to help determine the correct treatment in healthcare applications (e.g., dialysis). However, in some examples, light scattering/absorption techniques have limitations on measuring accuracy of the cloudiness and the turbidity of the fluid flow.

To address at least these exemplary problems as well as others, example apparatuses, systems, and methods described herein improve, in some examples, the measuring accuracy of the fluid composition and the fluid turbidity by using an image pattern slide. For example, a light source may emit and project a light beam through the image pattern slide and the fluid flow with suspended particles. In some examples, an imager may be configured to capture an image of the image pattern slide and a blur matrix may be generated based on the captured image of the image pattern slide. In some examples, the fluid turbidity and the fluid composition may be determined based on the blur matrix. In some examples, a particle scattering angle may be calculated by comparing the image of the image pattern slide with a baseline image of the image pattern slide. In some examples, the fluid composition may be determined based on the particle scattering angle.

Referring now to FIG. 1, an example diagram illustrating an apparatus 100 for measuring a fluid turbidity and a fluid composition in accordance with some example embodiments described herein is provided. As shown in FIG. 1, the apparatus 100 may comprise a tube 102, a light source 104, an image pattern slide 105, an imager 106, and a controller component 150. For example, the apparatus 100 may be configured to determine, by the controller component 150, a fluid turbidity and a fluid composition of the fluid flow 101 due to suspended particles in the fluid flow 101.

In some embodiments, the tube 102 may define a flow channel **102*a* for receiving a fluid flow 101. For example, the tube 102 may comprise a hollow portion that forms the flow channel 102*a*. For example, the flow channel 102*a* of the tube 102 may be in the form of a cavity that is within the tube 102. The flow channel 102*a* provides a passageway for the fluid flow 101 to travel inside the tube 102. For example, the cavity may provide an opening for receiving the fluid flow 101, and another opening for discharging the fluid flow 101. For example, the tube 102 may include a first sidewall 103*a* and a second sidewall 103*b* positioned on two sides of the tube 102** and apart from each other with a distance L.

For example, the tube 102 may be in a shape similar to a rectangular shape. Additionally, or alternatively, the tube 102 may be in other shapes.

In some examples, the tube 102 may comprise transparent or semi-transparent, and/or translucent materials. For example, the tube 102 may comprise glass. Additionally, or alternatively, the tube 102 may comprise other material(s). In some embodiments, the tube 102 may comprise material (s) that allow light beams to pass through.

In some embodiments, the light source 104 may be configured to produce, generate, emit, and/or trigger the production, generation, and/or emission of light. The light source 104 may include, but is not limited to, laser diodes (for example, violet laser diodes, visible laser diodes, edge-emitting laser diodes, surface-emitting laser diodes, and/or the like). Additionally, or alternatively, the light source 104 may comprise one or more light-emitting diodes (LEDs). Additionally, or alternatively, the light source 104 may comprise one or more other forms of natural and/or artificial sources of light.

For example, the light source 104 may be configured to emit at least one light beam. In some embodiments, the at least one light beam emitted by the light source 104 may comprise coherent light. In the present disclosure, the term coherent light refers to a light beam where the frequency of the light and the waveform of the light may be identical. Examples of coherent light include, but are not limited to, laser light. For example, the light beam in laser light has the same frequency and phase. In some embodiments, to emit coherent light, the light source 104 includes, but is not limited to, laser diodes (for example, violet laser diodes, visible laser diodes, edge-emitting laser diodes, surface-emitting laser diodes, and/or the like).

For example, the at least one light beam may be a collimated beam with a fixed spot area. In some examples, the fixed spot area may vary in different application. For example, the fixed spot area may be in range of 10 $mm^2$ to 500 $mm^2$, preferably be in range of 20 $mm^2$ to 100 $mm^2$, and more preferably of 50 $mm^2$.

For example, the at least one light beam emitted by the light source 104 may comprise incoherent light or at least partially incoherent light. In the present disclosure, the term "incoherent light" (or "low coherence light" as used interchangeably herein) refers to a light beam where the frequency of the light and the waveform of the light are not identical. For example, incoherent light does not contain photons with the same frequency and does not have wavelengths that are in phase with one another. In some embodiments, to emit incoherent light, the light source 104 may include, but is not limited to, light-emitting diodes (LEDs).

For example, the light source 104 may emit the at least one light beam with a wavelength of 405 nm, 525 nm, 860 nm, or 900 nm. For example, the light source 104 may emit the at least one light beam with a wavelength of 405 nm, 525 nm, 860 nm, or 900 nm to detect suspended particles such as white blood cells, neutrophiles, or leukocytes in Peritoneal dialysis (PD) dialysis. In some embodiments, the light source 104 may emit the at least one light beam with a wavelength of 780 nm, 840 nm, 860 nm, or 920 nm. For example, the light source 104 may emit the at least one light beam with a wavelength of 780 nm, 840 nm, 860 nm, or 920 nm to detect suspended particles such as fruit pulp in food processing.

For example, the light source 104 may be positioned on a first side of the tube 102. In some embodiments, the at least one light beam emitted by the light source 104 may be directed toward a first sidewall 103*a* of the tube 102.

While the description above provides an example of positional relationships between the light source 104 and the tube 102, it is noted that the scope of the present disclosure is not limited to the description above. In some examples, an example illumination source component may be positioned differently with respect to the tube 102 than the example shown in FIG. 1.

In some embodiments, the image pattern slide 105 may be positioned between the light source 104 and the first sidewall 103*a* of the tube 102. For example, the image pattern slide 105 may have a pre-designed pattern.

In some examples, the image pattern slide 105 may comprise transparent or semi-transparent, and/or translucent materials. For example, the image pattern slide 105 may be a glass slide with the pre-designed pattern. For example, the image pattern slide 105 may be a film slide with the pre-designed pattern.

For example, the image pattern slide 105 may be manufactured using a photolithography process.

For example, the light source 104 may be configured to emit the at least one light beam towards the image pattern slide 105 and project the pre-designed pattern through the fluid flow 101 and the tube 102 to the imager 106.

In some embodiments, as shown in FIG. 1, the imager 106 may be positioned on a second side of the tube 102. In some examples, the first side of the tube 102 and the second side of the tube 102 may be positioned on opposite sides of the tube 102. In some examples, the imager 106 may be positioned on a second sidewall 103*b* of the tube 102.

In some examples, the light source 104 may be aligned to the at least one imaging opening of the imager 106. For example, the at least one light beam emitted by the light source 104 may go through the image pattern slide 105 and enter the tube 102 via the first sidewall 103*a* of the tube 102. As the tube 102 comprises transparent materials, the at least one light beam travels through the fluid flow 101 in the tube 102, and then exits the tube 102 via the second sidewall 103*b* of the tube 102. Because the light source 104 may be aligned to the image pattern slide 105 and the at least one imaging opening, the at least one light beam emitted by the light source 104 then enters the at least one imaging opening, and arrives at the imager 106. In some embodiments, the imager 106 may be configured to generate digital image data of the image pattern slide 105.

In some examples, the imager 106 may comprise one or more image sensors. Various examples of the imager 106 may include, but are not limited to, a charge-coupled device (CCD), a complementary metal-oxide semiconductor (CMOS) sensor, and/or the like.

In some embodiments, the controller component 150 may be electrically coupled to and/or in electronic communication with the light source 104 and the imager 106.

Figure 2:
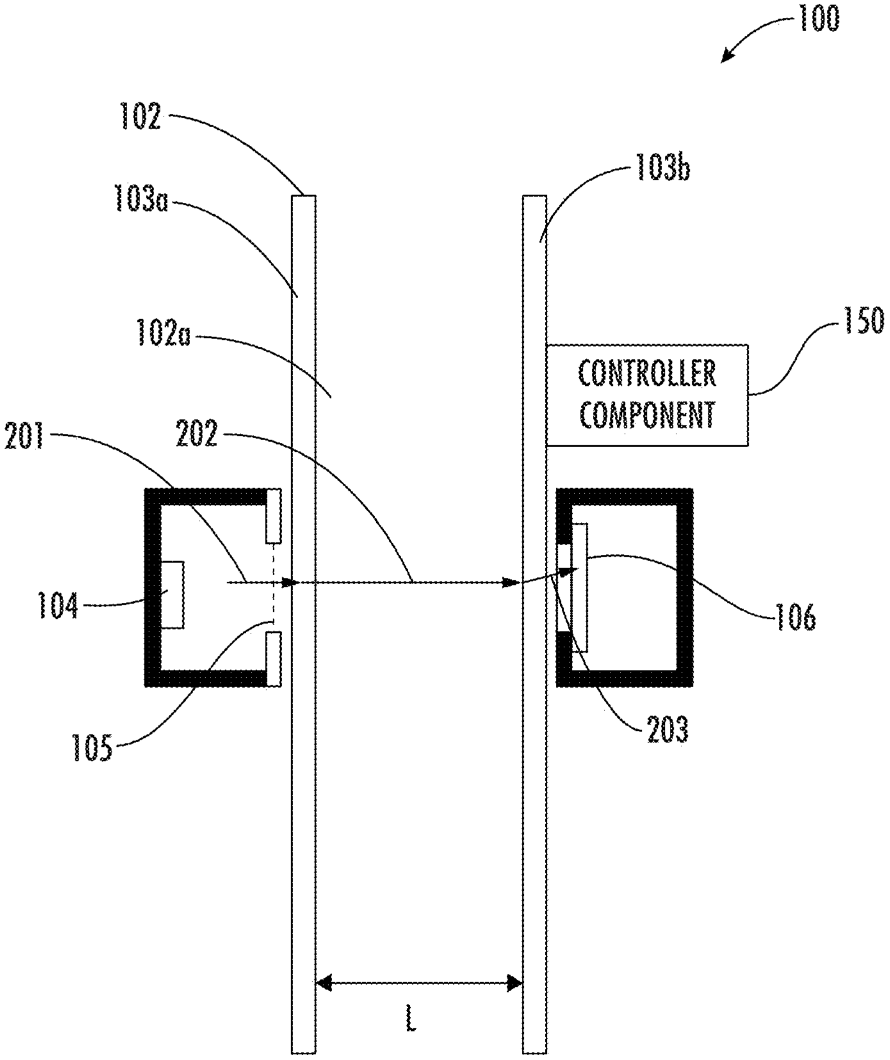
FIG. 2 illustrates an exemplary diagram depicting an optical path of an apparatus without a fluid flow, in accordance with various embodiments of the present disclosure.

Referring now to FIG. 2, an example diagram illustrating an optical path of an apparatus 100 without a fluid flow in accordance with some example embodiments described herein is provided. As shown in FIG. 2, the light source 104 of the apparatus 100 may emit the at least one light beam.

In some embodiments, the at least one light beam may travel along an example first light path (201, 202, and 203) from the light source 104 to the imager 106.

In some examples, the at least one light beam may travel through the image pattern slide 105 along a first section 201 of the example first light path and enter the tube 102. For example, the at least one light beam may be deflected at the first sidewall 103*a* of the tube 102 and enter the tube 102.

In some examples, the at least one light beam may travel through the tube 102 along a second section 202 of the example first light path and be deflected at the second sidewall 103*b* of the tube 102.

In some examples, a pathlength of the at least one light beam within the tube 102 may be equal to the distance L between the first sidewall 103*a* and the second sidewall 103*b*.

In some examples, the at least one light beam may travel through along a third section 203 of the example first light path and be detected by the imager 106.

In some examples, the at least one light beam may project the pre-designed pattern of the image pattern slide 105 to the imager 106. In some embodiments, the imager 106 may capture a first image of the image pattern slide 105. In some examples, the first image of the image pattern slide 105 may be a baseline image that has a base level of blur due to the lens effect from the tube 102. For example, the base level of blur of the first image may be determined based on the pathlength of the at least one light beam within the tube 102.

Figure 3:
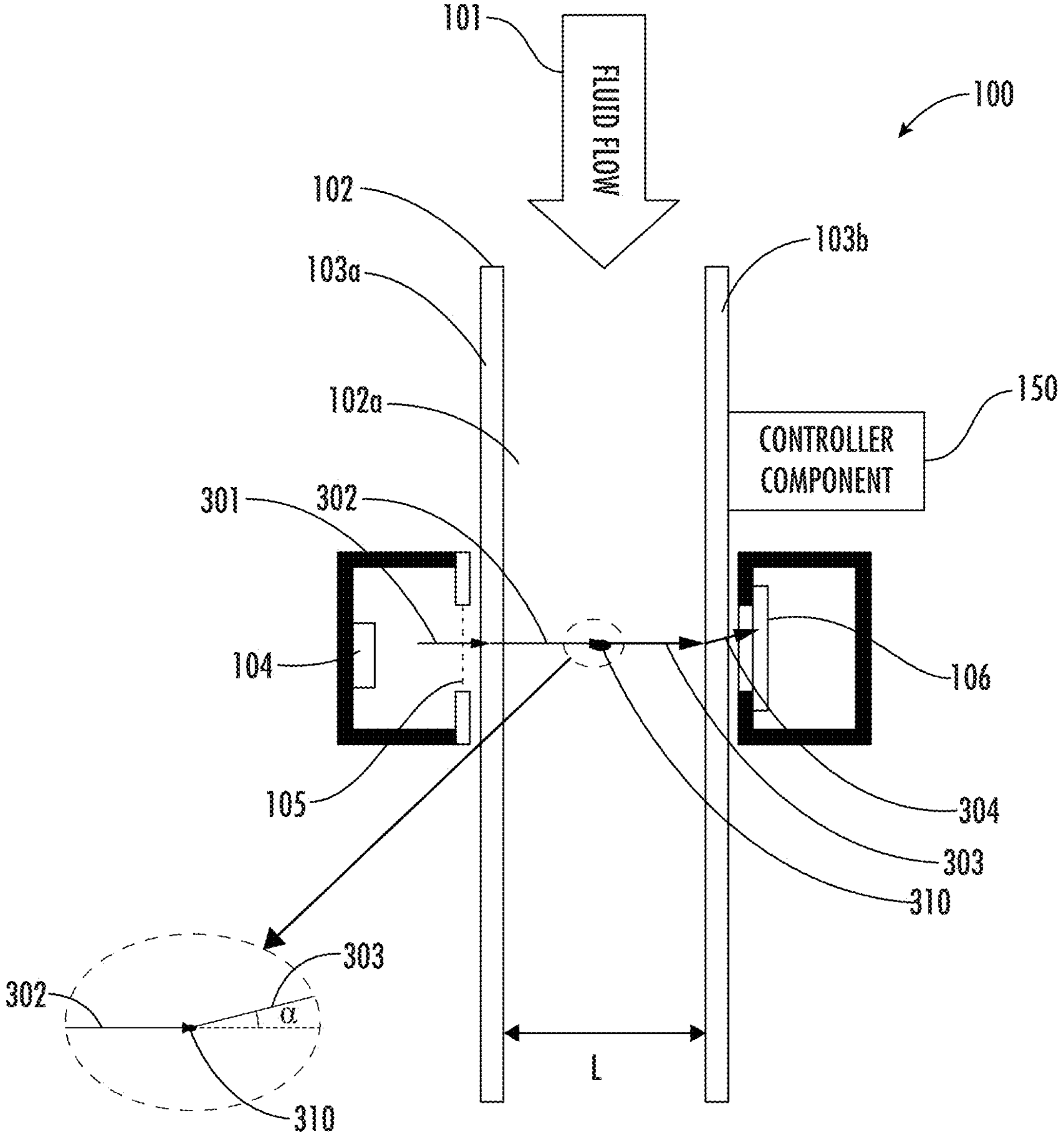
FIG. 3 illustrates an exemplary diagram illustrating an optical path of an apparatus with a fluid flow, in accordance with various embodiments of the present disclosure.

Referring now to FIG. 3, an example diagram illustrating an optical path of an apparatus 100 with a fluid flow in accordance with some example embodiments described herein is provided. As shown in FIG. 3, the light source 104 of the apparatus 100 may emit the at least one light beam.

In some embodiments, the at least one light beam may travel along an example second light path (301, 302, 303, and 304) from the light source 104 to the imager 106.

In some examples, the at least one light beam may travel through the image pattern slide 105 along a first section 301 of the example second light path and enter the tube 102. For example, the at least one light beam may be deflected at the first sidewall 103*a* of the tube 102 and enter the fluid flow 101.

In some embodiments, the fluid flow 101 may comprise a clear fluid with suspended particles 310, and the tube 102 may be filled with the fluid flow 101.

In some examples, the at least one light beam may travel through the fluid flow 101 along a second section 302 of the example second light path before the at least one light beam hits the suspended particles 310. In some examples, the at least one light beam may be scattered by the suspended particles 310 when the at least one light beam hits the suspended particles 310. For example, as shown in close-up view of the interaction of the at least one light beam with the suspended particles 310 on the left bottom of FIG. 3, the at least one light beam may be scattered by the suspended particles 310, such that a particle scattering angle α may be formed between the second section 302 of the example second light path and the third section 303 of the example second light path.

In some examples, the at least one light beam may continue to travel through the fluid flow 101 along a third section 303 of the example second light path after being scattered by the suspended particles 310.

In some examples, the at least one light beam may be further deflected at the second sidewall 103*b* of the tube 102.

In some examples, the at least one light beam may travel through along a fourth section 304 of the example first light path and be detected by the imager 106.

In some embodiments, the at least one light beam may project the pre-designed pattern of the image pattern slide 105 onto the imager 106. In some embodiments, the imager 106 may capture a second image of the image pattern slide 105. As shown in FIG. 3, for example, the at least one light beam may be further scattered by the suspended particles 310 comparing to the example first light path of FIG. 2. In some examples, the second image of the image pattern slide 105 may be a blurred image due to the scattering of the at least one light beam from the suspended particles 310.

In some embodiments, the particle scattering angle α may be determined based on the first image of the image pattern slide 105 and the second image of the image pattern slide 105.

In some examples, a size of the suspended particles 310 may be determined based on the particle scattering angle α. In some examples, the suspended particles 310 may be further identified based on the particle scattering angle α.

In some embodiments, a blur level may be determined by comparing the first image of the image pattern slide 105 and the second image of the image pattern slide 105.

In some examples, tube induced blurriness may be removed by subtracting the baseline image from the second image of the image pattern slide 105.

In some embodiments, a type of the suspended particles 310 may be determined based on the blur level. In some embodiments, a fluid composition may be determined based on the blur level. In some embodiments, a fluid turbidity of the fluid flow 101 may be determined based on the blur level. In some examples, the blur level may be quantified using image processing techniques, such as Laplacian. For example, a kernel window/matrix of (m×n) may be defined and a variance of pixel intensity may be calculated after performing a second derivative to calculate how fast pixel intensities are changing.

In some embodiments, a blur value of the captured image from imager may be derived by performing fast Fourier transform (FFT) on the image and calculating high frequency components.

For examples, a total numbers of edges in both horizontal rows and vertical columns of a given image pattern slide with matrix of white and black grid may be defined as a minimum number of high frequency components. The minimum number of high frequency components is the threshold value for an image to be qualified as blurred. For example, in an instance in which a total number of high frequency components is less than the threshold value. In some examples, the blur value is a difference between an actual number of frequency component and the threshold value.

In some embodiments, a blur value of the captured image from imager may be derived by performing Laplacian (second derivative) on image pixel intensities and deriving a variance. For example, a blurred image may have a lower variance of pixel intensities. The variance threshold value may be calculated based on edge transitions between the white and black grid.

In some embodiments, a kernel size may be at least twice of a size of the suspended particles. For example, the size of the suspended particles may be 5 μm and the pixel size may be 1 μm, then the kernel size may be 15 μm*15 μm.

In some embodiments, a blur matrix may be generated with the variance of pixel intensity for each defined kernel window/matrix. In some examples, similar blur matrix may be generated for each of the at least one light beam with different wavelengths.

In some embodiments, the blur matrix may be defined as a collection of the blur values of a kernel of m*n size tiled over the entire image intensity matrix. For example, an image of 480×240 pixels with a kernel size of 15*15, may have a 32*16 blur matrix. For example, the blur matrix may contain the blur value of the 15*15 pixels. In some examples, the blur value of each kernel is a difference between a total expected number of high frequency components and an actual number of high frequency components. For example, the expected number of high frequency components of each kernel may be determined by one-to-one mapping of the captured image of the image pattern slide with white & black edges in both horizontal and vertical direction on to the imager pixels.

In some embodiments, an inverse Tan function of blur value of each kernel may provide an estimation of the particle scattering angle α within such kernel coverage area. In some examples, the particle scattering angle α of each kernel may be calculated and compared with pre-calibrated scattering angle values of known solutions with given particle concentrations, such that a presence of a corresponding particle may be determined in the flow fluid.

In some embodiments, the fluid turbidity may be determined by calibrating the blur value with known standard turbidity calibration solutions. In some examples, the blur values of a standard turbidity solutions of at least 3 different turbidity levels may be taken to construct a best fit straight line (BFSL) calibration curve, an equation, and/or a table for look-up. In some examples, the equation may be used to derive the fluid turbidity.

In some embodiments, a blur threshold value may be pre-defined to mark representative blur value of each type of suspended particles. In some examples, the blur threshold value may be used to compare each blur matrix of a given wavelength to determine presence of the suspended particles. In some examples, a total blur matrix that satisfies the blur threshold value may be used to determine a concentration of the suspended particles in the fluid flow.

In some embodiments, the blur threshold value for an example type suspended particle may be determined by superimposing blur matrix of different wavelengths for the example type suspended particle.

In some embodiments, a machine learning (ML) model may be created and trained with the time series data of blur matrix of a set of wavelengths to identify & classify the particles of interest.

For example, time series image frames may be generated when images of the image pattern slide 105 are captured at time instances t1, t2, . . . , and tn with a pre-defined time interval for each wavelength. In some examples, a kernel size: (m×n) may be defined to accommodate the particle size and the imager pixel size. In some additional examples, a Laplacian operation may be performed on each kernel to generate the first derivative for gradient as well as obtain basic statistical parameter, such as maximum, minimum, median, and variance of the raw pixel data for the entire image. In some additional examples, the variance, the gradient, the maximum and minimum intensity, median, variance and cumulative Laplacian variance for each image are tabulated for each image at the given wavelengths.

In some examples, the ML model may be trained utilizing known particle in the fluid with time series image frames of each wavelength for classification of particles of interest. In some examples, the ML model may be refined and implemented to improve detection confidence.

Figure 4:
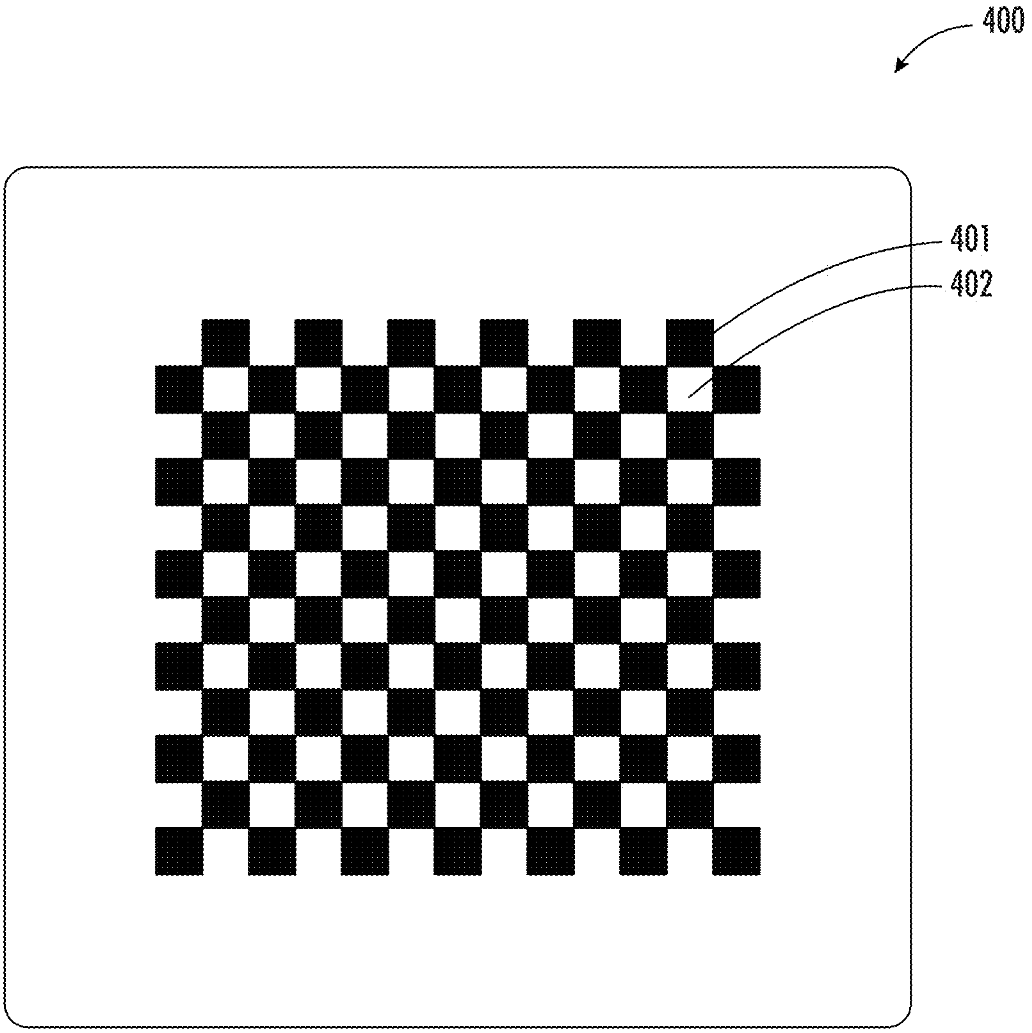
FIG. 4 illustrates an exemplary diagram depicting an exemplary image pattern slide, in accordance with various embodiments of the present disclosure.

Referring now to FIG. 4, a schematic diagram depicting an exemplary image pattern slide in accordance with various embodiments of the present disclosure is provided.

In some embodiments, as shown in FIG. 4, for example, an exemplary image pattern slide 400 may have a checkered pattern with black and white squares. In some examples, the exemplary image pattern slide 400 may comprise a plurality of black squares 401 and a plurality of white squares 402 aligned alternatively in two directions that are perpendicular to each other. For example, each of the plurality of black squares 401 of the exemplary image pattern slide 400 may block the at least one light beam from the light source 104.

For example, each of the plurality of white squares 402 of the exemplary image pattern slide 400 may let the at least one light beam from the light source 104 pass through.

In some embodiments, a size of the exemplary image pattern slide 400 may be in a range of 0.1 mm to 10 mm, preferably be in range of 0.5 mm to 2 mm, and more preferably of 1 mm. In some embodiments, a size of each of the plurality of black squares 401 may be in a range of 0.1 μm to 10 μm, preferably be in range of 0.5 μm to 2 μm, and more preferably of 1 μm. In some embodiments, a size of each of the plurality of white squares 402 may be in a range of 10 μm to 100 μm, preferably be in range of 40 μm to 60 μm, and more preferably of 50 μm.

Figure 5:
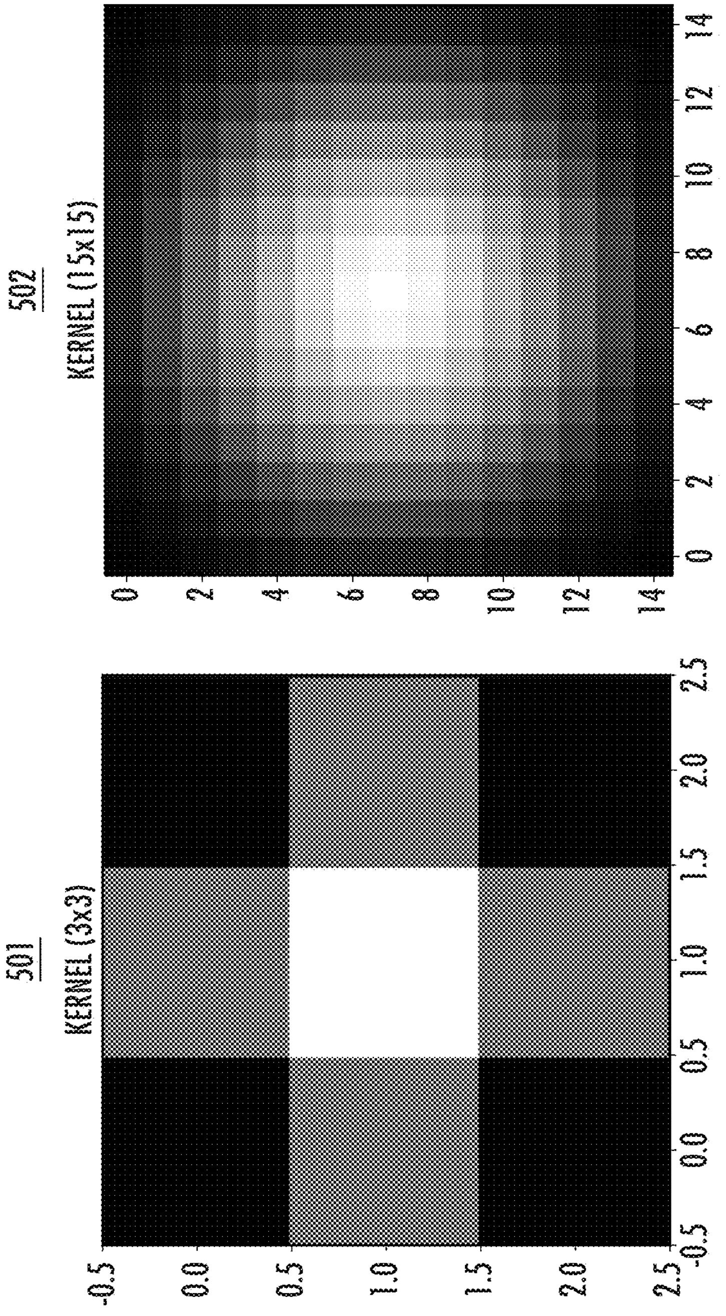
FIG. 5 illustrates an exemplary diagram depicting exemplary projected images, in accordance with various embodiments of the present disclosure.

Referring now to FIG. 5, a schematic diagram depicting exemplary projected images in accordance with various embodiments of the present disclosure is provided.

In some embodiments, as shown on the left of FIG. 5, an example first image 501 of the exemplary image pattern slide 400 may be captured by the imager 106 when no fluid flow is presented in the tube 102. Referring back to FIG. 2, the example first image 501 of the exemplary image pattern slide 400 may be a baseline image with only a base level of blur due to the lens effect from the tube 102.

In some embodiments, as shown on the right of FIG. 5, an example second image 502 of the exemplary image pattern slide 400 may be captured by the imager 106 when the fluid flow 101 with the suspended particles 310 is flowing through the tube 102. Referring back to FIG. 3, the example second image 502 of the exemplary image pattern slide 400 may be blurred when the at least one light beam is further scattered by the suspended particles 310.

In some embodiments, a blur level may be determined by comparing the example first image 501 of the exemplary image pattern slide 400 and the example second image 502 of the exemplary image pattern slide 400.

In some embodiments, a type of the suspended particles 310 may be determined based on the blur level. In some embodiments, a fluid turbidity of the fluid flow 101 may be determined based on the blur level. In some examples, the blur level may be quantified using image processing techniques, such as Laplacian. For example, a kernel window/matrix of (m×n) may be defined and a variance of pixel intensity may be found after performing a second derivative to calculate how fast pixel intensities are changing.

In some embodiments, a blur matrix may be generated with the variance of pixel intensity for each defined kernel window/matrix. In some examples, similar blur matrix may be generated for each of the at least one light beam with different wavelengths.

In some embodiments, a blur threshold value may be pre-defined to mark representative blur value of different particles/cells. In some examples, the blur threshold value may be used to compare each blur matrix of a given wavelength to determine presence of the suspended particles. In some examples, a total blur matrix that satisfies the blur threshold value may be used to determine a concentration of the suspended particles in the fluid flow.

Figure 6:
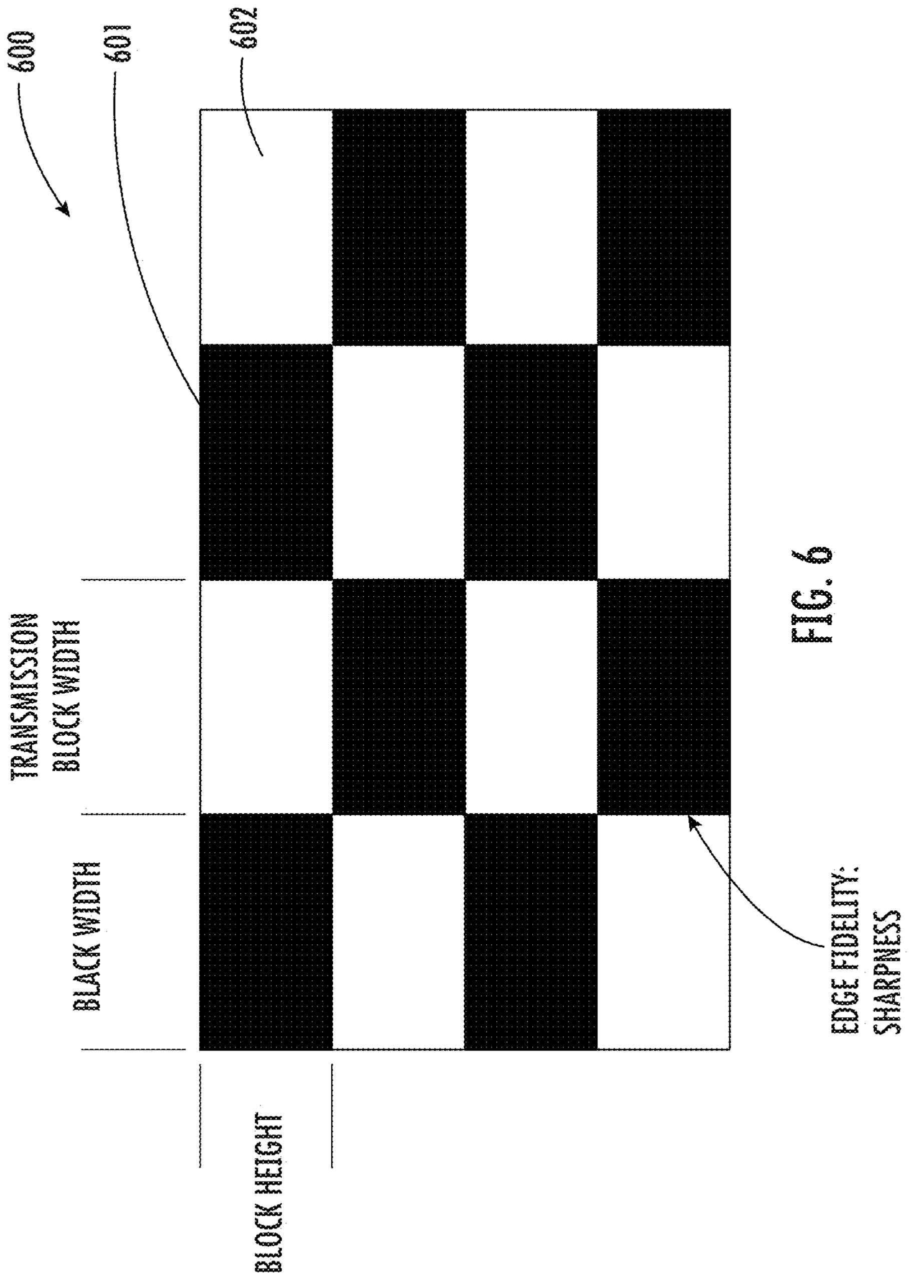
FIG. 6 illustrates an exemplary diagram depicting an exemplary image pattern slide, in accordance with various embodiments of the present disclosure.

Referring now to FIG. 6, a schematic diagram depicting an exemplary image pattern slide in accordance with various embodiments of the present disclosure is provided.

In some embodiments, as shown in FIG. 6, for example, an exemplary image pattern slide 600 may have a checkered pattern with black and white rectangles. In some examples, the exemplary image pattern slide 600 may comprise a plurality of black rectangle 601 and a plurality of white rectangle 602 aligned alternatively in two directions that are perpendicular to each other. For example, each of the plurality of black rectangle 601 of the exemplary image pattern slide 600 may block the at least one light beam from the light source 104. For example, each of the plurality of white rectangle 602 of the exemplary image pattern slide 600 may let the at least one light beam from the light source 104 to pass through.

In some embodiments, a size of the exemplary image pattern slide 600 may be in a range of 0.1 mm to 10 mm, preferably be in range of 0.5 mm to 2 mm, and more preferably of 1 mm. In some embodiments, a size (width or height) of each of the plurality of black rectangle 601 may be in a range of 0.1 μm to 10 μm, preferably be in range of 0.5 μm to 2 μm, and more preferably of 1 μm. In some embodiments, a size (width or height) of each of the plurality of white rectangle 602 may be in a range of 10 μm to 100 μm, preferably be in range of 40 μm to 60 μm, and more preferably of 50 μm.

In some embodiments, the exemplary image pattern slide 600 may be manufactured using a photolithography process. In some examples, an edge sharpness of the exemplary image pattern slide 600 between adjacent rectangles may depend on the photolithography process.

Figure 7:
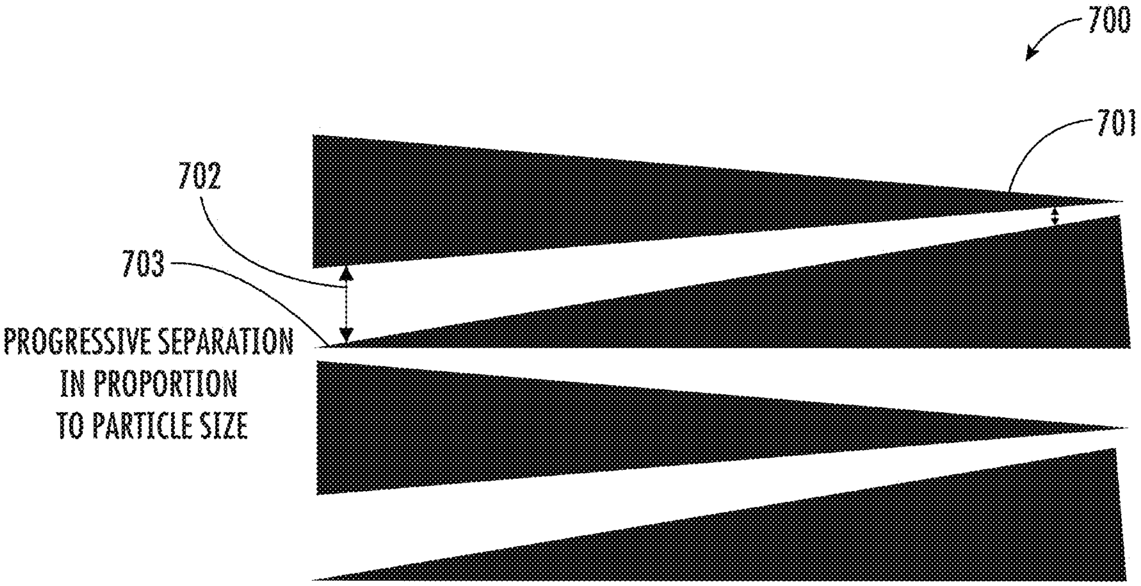
FIG. 7 illustrates an exemplary diagram depicting an exemplary image pattern slide, in accordance with various embodiments of the present disclosure.

Referring now to FIG. 7, a schematic diagram depicting an exemplary image pattern slide in accordance with various embodiments of the present disclosure is provided.

In some embodiments, as shown in FIG. 7, for example, an exemplary image pattern slide 700 may have a black triangles pattern. In some examples, the exemplary image pattern slide 700 may comprise a plurality of black triangles 701 aligned and spaced from each other. In some examples, a distance 702 between two adjacent black triangles of the plurality of black triangles 701 may change along an edge 703 of two adjacent black triangles of the plurality of black triangles 701. For example, the distance 702 between two adjacent black triangles of the plurality of black triangles 701 may increase/decrease linearly along the edge 703 of two adjacent black triangles of the plurality of black triangles 701.

In some embodiments, the distance 702 between two adjacent black triangles of the plurality of black triangles 701 may be proportional to the size of the suspended particles in the fluid flow.

Figure 8:
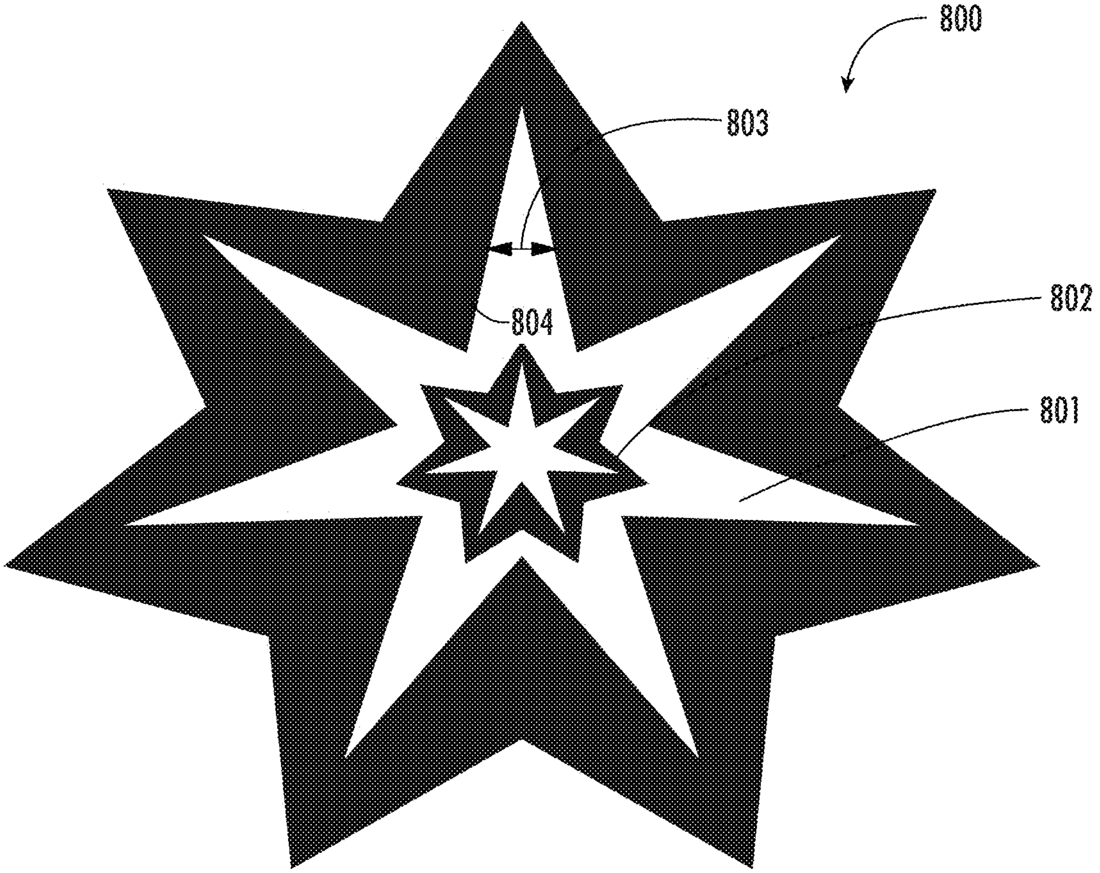
FIG. 8 illustrates an exemplary diagram depicting an exemplary image pattern slide, in accordance with various embodiments of the present disclosure.

Referring now to FIG. 8, a schematic diagram depicting an exemplary image pattern slide in accordance with various embodiments of the present disclosure is provided.

In some embodiments, as shown in FIG. 8, for example, an exemplary image pattern slide 800 may have a white stars pattern. In some examples, the exemplary image pattern slide 800 may comprise a plurality of white concentric stars 801 separated by black stripes 802. In some examples, each of the plurality of white concentric stars 801 may be a six-point star. In some examples, a distance 803 between two adjacent edges 804 of each of the white concentric stars 801 may change along the two adjacent edges 804. For example, the distance 803 between two adjacent edges 804 of each of the white concentric stars 801 may decrease along the two adjacent edges 804 towards the corresponding apex.

In some embodiment, the exemplary image pattern slides in FIG. 6, FIG. 7, and FIG. 8 may be used as the image pattern slide 105 as shown in FIG. 1, FIG. 2, and FIG. 3. Other examples of image pattern slides with different image patterns may also be used to detect/measure the fluid turbidity and the fluid composition of the fluid flow.

In some embodiments, a ML model may be created and trained with the time series data of blur matrix of a set of wavelengths to identify & classify the particles of interest. For example, the ML models may be created and trained with known suspended particles in the fluid flow. In some examples, the ML model may be implemented at edges of the exemplary image pattern slides in FIG. 6, FIG. 7, and FIG. 8 to determine particle types of the suspended particles in the fluid flow in real-time.

Figure 9:
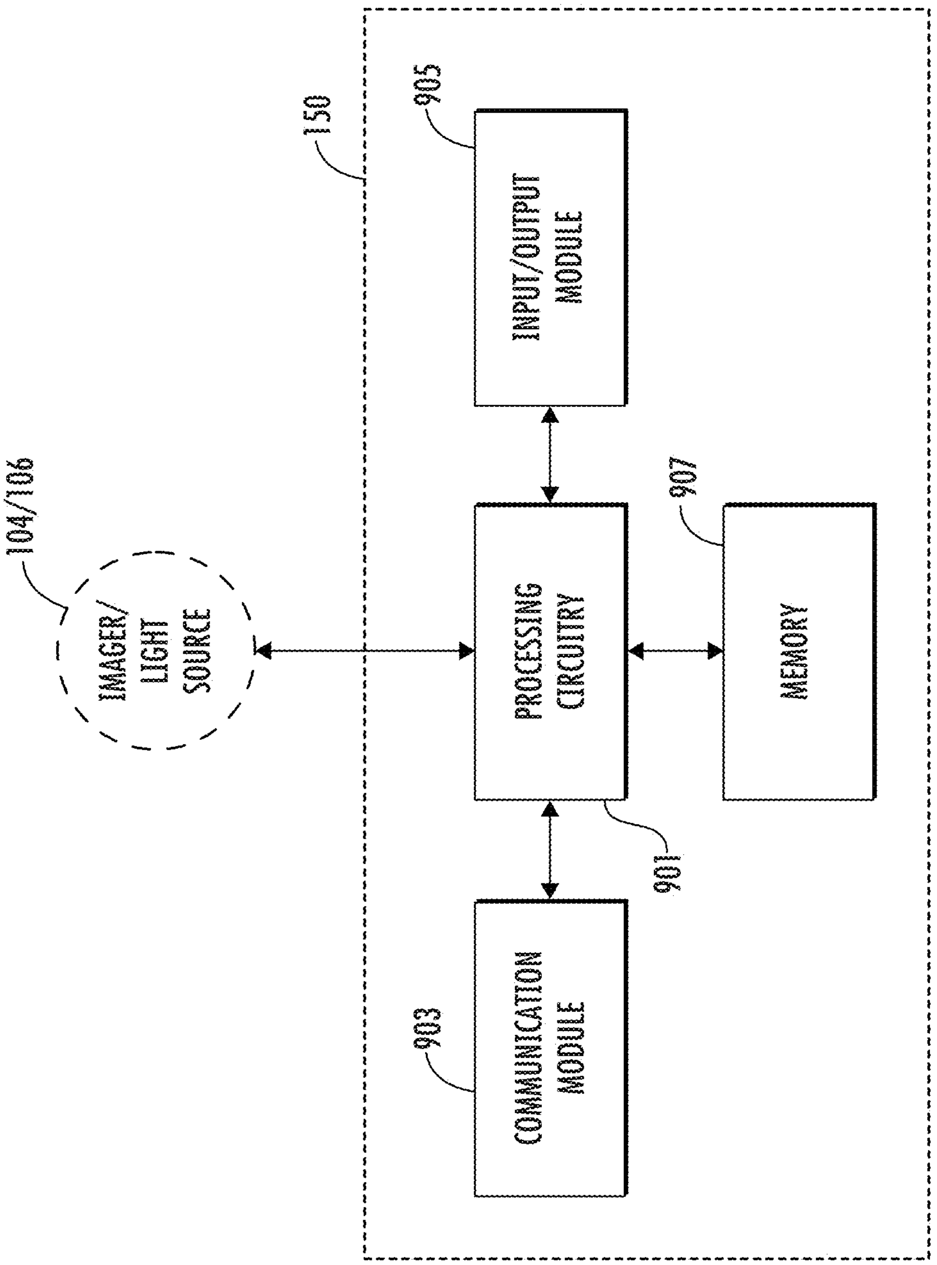
FIG. 9 illustrates an exemplary diagram depicting a controller component, in accordance with various embodiments of the present disclosure.

Referring now to FIG. 9, a schematic diagram depicting a controller component 150 in accordance with various embodiments of the present disclosure is provided. As shown, The controller component 150 may comprise a processing circuitry 901, a communication module 903, input/output module 905, a memory 907, and/or other components configured to perform various operations, procedures, functions or the like described herein.

As shown in FIG. 9, the controller component 150 (such as the processing circuitry 901, communication module 903, input/output module 905 and memory 907) may be electrically coupled to and/or in electronic communication with the imager 106 and/or the light source 104. As depicted, the imager 106 and/or the light source 104 may exchange (e.g., transmit and receive) data with the processing circuitry 901 of the controller component 150. For example, the imager 106 and/or the light source 104 may generate data and transmit the data to the processing circuitry 901.

The processing circuitry 901 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 901 may include one or more processors. In one exemplary embodiment, the processing circuitry 901 may be configured to execute instructions stored in the memory 907 or otherwise accessible by the processing circuitry 901. When executed by the processing circuitry 901, these instructions may enable the controller component 150 to execute one or a plurality of the functions as described herein. No matter whether it is configured by hardware, firmware/software methods, or a combination thereof, the processing circuitry 901 may include entities capable of executing operations according to the embodiments of the present invention when correspondingly configured. Therefore, for example, when the processing circuitry 901 is implemented as an ASIC, an FPGA, or the like, the processing circuitry 901 may include specially configured hardware for implementing one or a plurality of operations described herein. Alternatively, as another example, when the processing circuitry 901 is implemented as an actuator of instructions (such as those that may be stored in the memory 907), the instructions may specifically configure the processing circuitry 901 to execute one or a plurality of algorithms and operations described herein.

The memory 907 may include, for example, a volatile memory, a non-volatile memory, or a certain combination thereof. Although illustrated as a single memory in FIG. 5, the memory 907 may include a plurality of memory components. In various embodiments, the memory 907 may include, for example, a hard disk drive, a random-access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 907 may be configured to store information, data, application programs, instructions, and etc., so that the controller component 150 can execute various functions according to the embodiments of the present disclosure. For example, in at least some embodiments, the memory 907 may be configured to cache input data for processing by the processing circuitry 901. Additionally, or alternatively, in at least some embodiments, the memory 907 may be configured to store program instructions for execution by the processing circuitry 901. The memory 907 may store information in the form of static and/or dynamic information. When the functions are executed, the stored information may be stored and/or used by the controller component 150.

The communication module 903 may be implemented as any apparatus included in a circuit, hardware, a computer program product, or a combination thereof, which is configured to receive and/or transmit data from/to another component or apparatus. The computer program product includes computer-readable program instructions stored on a computer-readable medium (for example, the memory 907) and executed by a controller component 150 (for example, the processing circuitry 901). In some embodiments, the communication module 903 (as with other components discussed herein) may be at least partially implemented as the processing circuitry 901 or otherwise controlled by the processing circuitry 901. In this regard, the communication module 903 may communicate with the processing circuitry 901, for example, through a bus. The communication module 903 may include, for example, antennas, transmitters, receivers, transceivers, network interface cards and/or supporting hardware and/or firmware/software, and is used for establishing communication with another apparatus. The communication module 903 may be configured to receive and/or transmit any data that may be stored by the memory 907 by using any protocol that can be used for communication between apparatuses. The communication module 903 may additionally or alternatively communicate with the memory 907, the input/output module 905 and/or any other component of the controller component 150, for example, through a bus.

In some embodiments, the controller component 150 may include an input/output module 905. The input/output module 905 may communicate with the processing circuitry 901 to receive instructions input by the user and/or to provide audible, visual, mechanical, or other outputs to the user. Therefore, the input/output module 905 may include supporting devices, such as a keyboard, a mouse, a display, a touch screen display, and/or other input/output mechanisms. Alternatively, at least some aspects of the input/output module 905 may be implemented on a device used by the user to communicate with the controller component 150. The input/output module 905 may communicate with the memory 907, the communication module 903 and/or any other component, for example, through a bus. One or a plurality of input/output modules and/or other components may be included in the controller component 150.

Figure 10:
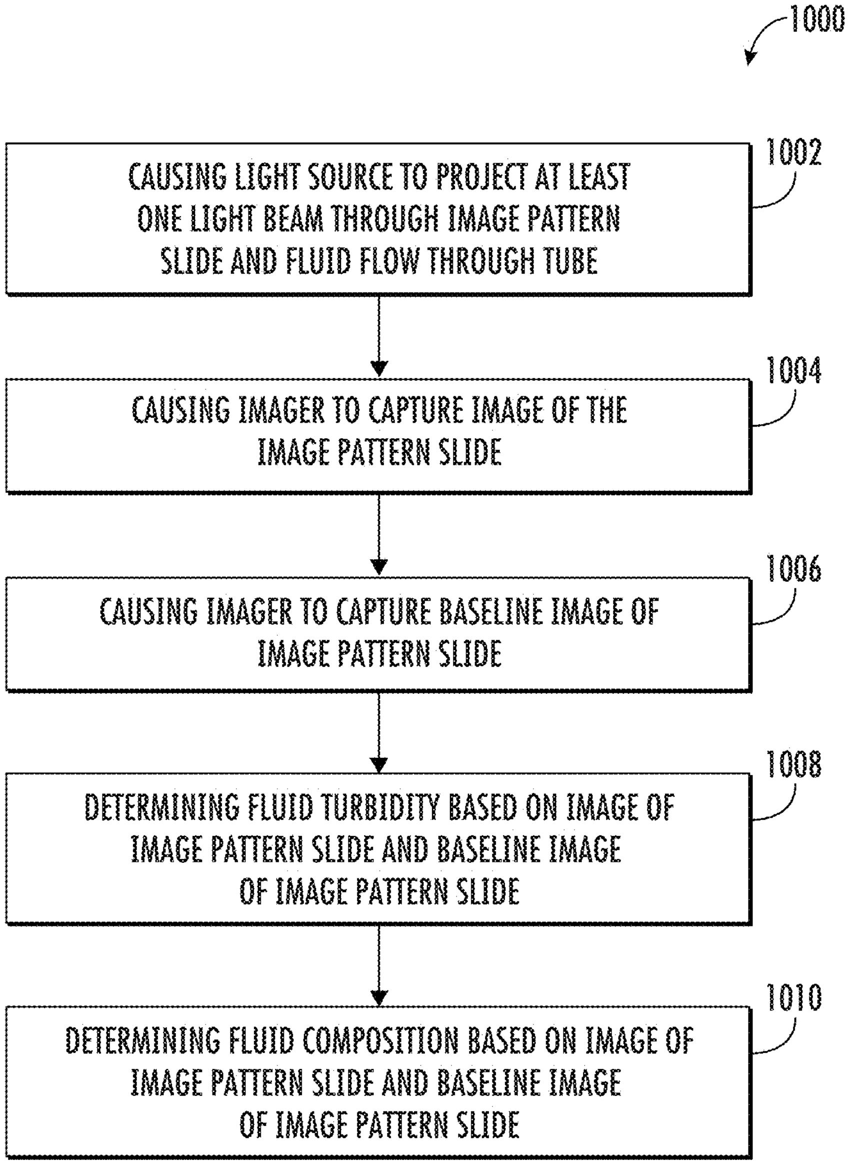
FIG. 10 illustrates an exemplary flow diagram illustrating an exemplary method for measuring a fluid turbidity and a fluid composition by a controller component, in accordance with various embodiments of the present disclosure.

Referring now to FIG. 10, an exemplary flow diagram illustrating an exemplary method for measuring a fluid turbidity and a fluid composition by a controller component in accordance with some exemplary embodiments of the present disclosure are provided. It is noted that each block of a flowchart, and combinations of blocks in the flowchart, may be implemented by various means such as hardware, firmware, circuitry and/or other devices associated with execution of software including one or more computer program instructions. For example, one or more of the steps/operations described in FIG. 10 may be embodied by computer program instructions, which may be stored by a non-transitory memory of an apparatus employing an embodiment of the present disclosure and executed by a processor component in an apparatus (such as, but not limited to, a controller component, a programmable processor, a mobile device, a remote computing server, and/or the like). For example, these computer program instructions may direct the processor component to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may include various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 10, an exemplary method 1000 for measuring the fluid turbidity and the fluid composition in accordance with some exemplary embodiments described herein is illustrated. The exemplary method 1000 may be executed by a computing device associated with a controller component (for example, the controller component 150 as illustrated and described above in connection with at least FIG. 1) including processing circuitry and memory (for example, the processing circuitry 901 and the memory 907 as illustrated and described above in connection with at least FIG. 5).

At step/operation 1002, the controller component 150 may cause a light source 104 to emit and/or project at least one light beam through an image pattern slide 105 and a fluid flow 101 through a tube 102. In some embodiments, for example, as shown in FIG. 1, the tube 102 may define a flow channel **102*a* for receiving the fluid flow 101. In some embodiments, the fluid flow 101 with suspended particles 310 may be provided to flow through the flow channel 102*a* of the tube 102**.

In some embodiments, the image pattern slide 105 may be located between the light source 104 and a first sidewall **103*a* of the tube 102. In some embodiments, as shown in FIG. 4, for example, the image pattern slide 105 may have a checkered pattern with black and white squares. In other example embodiments, as shown in FIG. 6, for example, the image pattern slide 105** may have a checkered pattern with black and white rectangles.

In some embodiments, as shown in FIG. 7, for example, the image pattern slide 105 may have a black triangles pattern. In some examples, the image pattern slide 105 may comprise a plurality of black triangles 701 aligned and spaced from each other. In some examples, a distance 702 between two adjacent black triangles of the plurality of black triangles 701 may change along an edge 703 of two adjacent black triangles of the plurality of black triangles 701. For example, the distance 702 between two adjacent black triangles of the plurality of black triangles 701 may increase/decrease linearly along the edge 703 of two adjacent black triangles of the plurality of black triangles 701.

In some embodiments, as shown in FIG. 8, for example, the image pattern slide 105 may have a white stars pattern.

In some examples, the image pattern slide 105 may comprise a plurality of white concentric stars 801 separated by black stripes 802. In some examples, each of the plurality of white concentric stars 801 may be a six-point star. In some examples, a distance 803 between two adjacent edges 804 of each of the white concentric stars 801 may change along the two adjacent edges 804. For example, the distance 803 between two adjacent edges 804 of each of the white concentric stars 801 may decrease along the two adjacent edges 804 towards the corresponding apex.

At step/operation 1004, the controller component 150 may cause an imager 106, located on a second sidewall 103*b* of the tube 102, to capture an image of the image pattern slide 105. For example, the at least one light beam emitted by the light source 104 may go through the image pattern slide 105 and enter the tube 102 via the first sidewall 103*a* of the tube 102. In some embodiments, the at least one light beam may travel through the fluid flow 101 in the tube 102, and then exit the tube 102 via the second sidewall 103*b* of the tube 102. In some examples, the at least one light beam may be scattered by the suspended particles 310 in the fluid flow 101.

In some embodiments, as shown in FIG. 3, the light source 104 may be aligned to the at least one imaging opening of the imager 106. In some examples, the at least one light beam emitted by the light source 104 may enter the at least one imaging opening, and arrive at the imager 106. In some embodiments, the imager 106 may be configured to generate digital image data of the image pattern slide 105.

At step/operation 1006, the controller component 150 may cause the imager 106 to capture a baseline image of the image pattern slide 105.

In some embodiments, the imager 106 may capture the baseline image of the image pattern slide 105 in an instance in which no fluid flow is in the tube 102. For example, the baseline image may have a base level of blur due to the lens effect from the tube 102.

At step/operation 1008, the controller component 150 may determine the fluid turbidity based on the image of the image pattern slide and a baseline image of the image pattern slide. Additional details with regard to determining the fluid turbidity is described with respect to FIG. 11.

Figure 11:
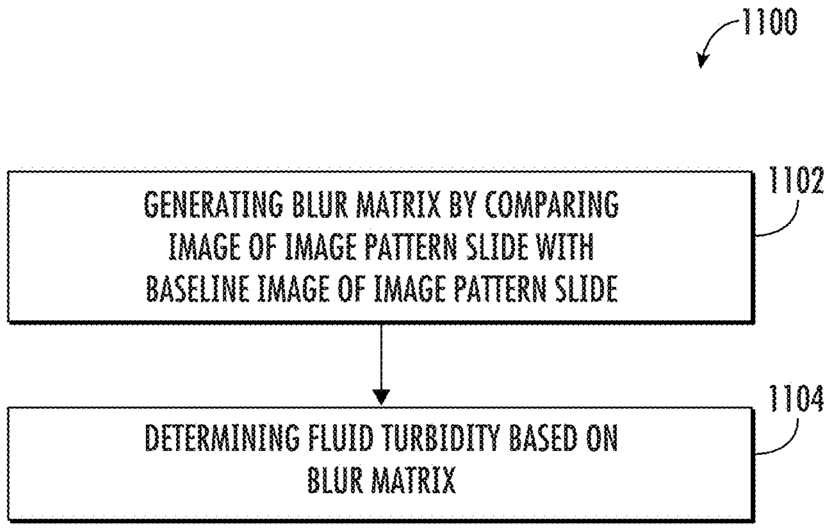
FIG. 11 illustrates an exemplary flow diagram illustrating an exemplary method for determining the fluid turbidity based on an image of the image pattern slide and a baseline image of the image pattern slide, in accordance with various embodiments of the present disclosure.

Referring now to FIG. 11, a flowchart diagram illustrating an exemplary method 1100 of performing the step/operation 1008 to determine the fluid turbidity based on the image of the image pattern slide 105 and the baseline image of the image pattern slide 105 is provided.

At step/operation 1102, the controller component 150 may generate a blur matrix by comparing the image of the image pattern slide with the baseline image of the image pattern slide.

In some embodiments, a blur matrix may be generated with the variance of pixel intensity for each defined kernel window/matrix. In some examples, similar blur matrix may be generated for each of the at least one light beam with different wavelengths.

At step/operation 1104, the controller component 150 may determine the fluid turbidity based on the blur matrix.

In some embodiments, a blur threshold value may be pre-defined and function as a representative blur value of each type of suspended particles. In some examples, the blur threshold value may be compared to each blur matrix of a given wavelength to determine presence of the suspended particles. In some examples, total blur matrix that satisfy the blur threshold value may be used to determine a concentration of the suspended particles in the fluid flow.

In some embodiments, the blur threshold value for an example type of suspended particles may be determined by superimposing blur matrix of different wavelengths for the example type of suspended particles.

Referring back to FIG. 10, at step/operation 1010, the controller component 150 may determine a type of the suspended particles based on the image of the image pattern slide 105 and the baseline image of the image pattern slide 105. Additional details with regard to determining the type of the suspended particles is described with respect to FIG. 12.

Figure 12:
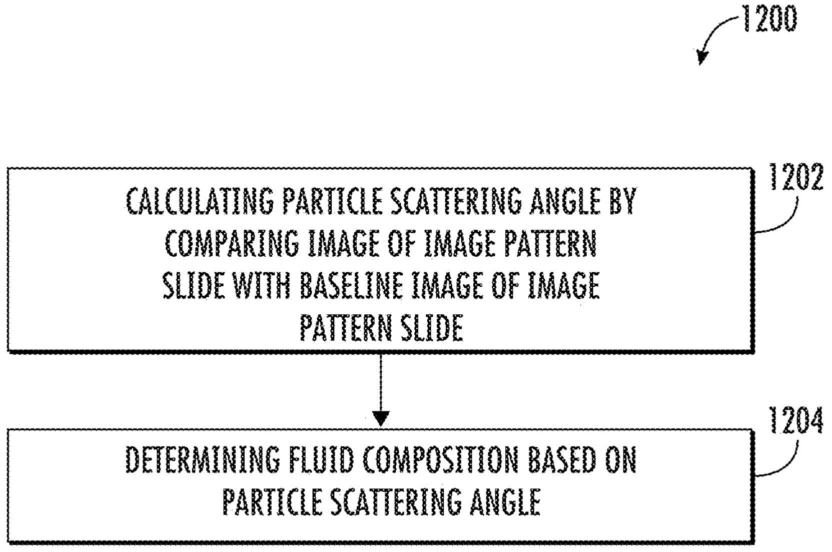
FIG. 12 illustrates an exemplary flow diagram illustrating an exemplary method for determining the fluid composition based on an image of the image pattern slide and a baseline image of the image pattern slide, in accordance with various embodiments of the present disclosure.

Referring now to FIG. 12, a flowchart diagram illustrating an exemplary method 1200 of performing the step/operation 1010 to determine the fluid composition based on the image of the image pattern slide 105 and the baseline image of the image pattern slide 105 is provided.

At step/operation 1202, the controller component 150 may calculate a particle scattering angle by comparing the image of the image pattern slide 105 with the baseline image of the image pattern slide 105.

In some embodiments, the blur matrix may be defined as a collection of the blur values of a kernel of m*n size tiled over the entire image intensity matrix. For example, an image of 480×240 pixels with a kernel size of 15*15, may have a 32*16 blur matrix. For example, the blur matrix may contain the blur value of the 15*15 pixels. In some examples, the blur value of each kernel is a difference between a total expected number of high frequency components and an actual number of high frequency components. For example, the expected number of high frequency components of each kernel may be determined by one-to-one mapping of the captured image of the image pattern slide with white & black edges in both horizontal and vertical direction on to the imager pixels.

In some embodiments, an inverse Tan function of blur value of each kernel may provide an estimation of the particle scattering angle $\alpha$ within such kernel coverage area. In some examples, the particle scattering angle $\alpha$ of each kernel may be calculated and compared with pre-calibrated scattering angle values of known solutions with given particle concentrations, such that a presence of a corresponding particle may be determined in the flow fluid.

At step/operation 1204, the controller component 150 may determine the fluid composition based on the particle scattering angle.

In some embodiments, as shown in close-up view of the interaction of the at least one light beam with the suspended particles 310 on the left bottom of FIG. 3, the at least one light beam may be scattered by the suspended particles 310, such that a particle scattering angle $\alpha$ may be formed between the second section 302 of the example second light path and the third section 303 of the example second light path.

In some embodiments, the particle scattering angle $\alpha$ may be a characteristic property of the suspended particles. For example, the particle scattering angle $\alpha$ may be used to calculate the size of the suspended particles, such that the type of the suspended particles may be determined.

As described above and as will be appreciated based on this disclosure, embodiments of the present disclosure may include various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. A method for measuring a fluid turbidity and a fluid composition by a controller component, comprising:
- causing a light source to project at least one light beam through an image pattern slide and a fluid flow through a tube, wherein the image pattern slide is located between the light source and a first sidewall of the tube;
- causing an imager to capture a baseline image of the image pattern slide;
- causing the imager to capture an image of the image pattern slide;
- generating a blur matrix by comparing the image of the image pattern slide with the baseline image of the image pattern slide; and
- determining the fluid turbidity based on the blur matrix.

2. The method according to claim 1, further comprising:
- determining the fluid composition based on the image of the image pattern slide and the baseline image of the image pattern slide.

3. The method according to claim 2, wherein determining the fluid composition based on the image of the image pattern slide and the baseline image of the image pattern slide the fluid turbidity comprises:
- calculating a particle scattering angle by comparing the image of the image pattern slide with the baseline image of the image pattern slide; and
- determining the fluid composition based on the particle scattering angle.

4. The method according to claim 1, wherein:
- the at least one light beam is a coherent light beam.

5. The method according to claim 1, wherein:
- the imager is located on a second sidewall of the tube, and the imager is a CMOS or CCD camera, configured to capture the image of the image pattern slide by generating digital image data of the image pattern slide.

6. The method according to claim 1, wherein:
- the tube is made of a material that allows the at least one light beam to pass through, and configured to define a flow channel for the fluid flow with suspended particles to flow through.

7. The method according to claim 1, wherein:
- the image pattern slide has a checkered pattern.

8. The method according to claim 1, wherein:
- the image pattern slide has a concentric stars pattern.

9. The method according to claim 1, wherein:
- the image pattern slide has a black triangles pattern, wherein a distance between two adjacent black triangles changes linearly along edges of the two adjacent black triangles.

10. An apparatus for measuring a fluid turbidity and a fluid composition by a controller component, comprising:
- a light source;
- a tube;
- an image pattern slide;
- an imager located on a second sidewall of the tube; and
- the controller component electrically connected to the light source and the imager, wherein the controller component is configured to:
  - cause the imager to capture a baseline image of the image pattern slide;
  - cause the light source to project at least one light beam through the image pattern slide and a fluid flow through the tube;
  - cause the imager to capture an image of the image pattern slide;
  - generate a blur matrix by comparing the image of the image pattern slide with the baseline image of the image pattern slide; and
  - determine the fluid turbidity based on the blur matrix.

11. The apparatus according to claim 10, wherein the controller component is further configured to:
- determine the fluid composition based on the image of the image pattern slide and the baseline image of the image pattern slide.

12. The apparatus according to claim 11, wherein to determine the fluid composition based on the image of the image pattern slide and the baseline image of the image pattern slide the fluid turbidity, the controller component is configured to:
- calculate a particle scattering angle by comparing the image of the image pattern slide with the baseline image of the image pattern slide; and
- determine the fluid composition based on the particle scattering angle.

13. The apparatus according to claim 10, wherein:
- the at least one light beam is a coherent light beam.

14. The apparatus according to claim 10, wherein:
- the imager is a CMOS or CCD camera, configured to capture the image of the image pattern slide by generating digital image data of the image pattern slide.

15. The apparatus according to claim 10, wherein:
- the tube is made of a material that allows the at least one light beam to pass through, and configured to define a flow channel for the fluid flow with suspended particles to flow through.

16. The apparatus according to claim 10, wherein:
- the image pattern slide has a checkered pattern.

17. The apparatus according to claim 10, wherein:
- the image pattern slide has a concentric stars pattern.

18. The apparatus according to claim 10, wherein:
- the image pattern slide has a black triangles pattern, wherein a distance between two adjacent black triangles changes linearly along edges of the two adjacent black triangles.

* * * * *